US005839740A

United States Patent [19]

Seeger

[11] Patent Number: 5,839,740

[45] Date of Patent: Nov. 24, 1998

[54] CART FOR INJURED PERSONS

[76] Inventor: Jerral C. Seeger, 6142 Thrall Ave., Vicksburg, Mich. 49097

[21] Appl. No.: 979,174

[22] Filed: Nov. 26, 1997

[51] Int. Cl.$^6$ .......... B62B 3/02

[52] U.S. Cl. .......... 280/87.021; 135/67; 280/87.01; 280/87.041; 297/5; 482/66

[58] Field of Search .......... 280/87.1, 87.021, 280/87.041, 87.05, 304.1, 30, 657, 638; 297/5; 5/81.1 R; 482/66, 69; 135/67, 66, 74; 119/725, 726, 727, 814

[56] References Cited

U.S. PATENT DOCUMENTS

| | | | |
|---|---|---|---|
| 1,668,623 | 5/1928 | Avril | 280/87.021 |
| 4,239,248 | 12/1980 | Ewers . | |
| 4,861,051 | 8/1989 | Napper . | |
| 5,086,798 | 2/1992 | Motts | 297/5 |
| 5,167,597 | 12/1992 | David . | |
| 5,411,035 | 5/1995 | Stone . | |
| 5,427,391 | 6/1995 | Cooper . | |
| 5,702,326 | 12/1997 | Renteria | 135/67 |

FOREIGN PATENT DOCUMENTS

| | | | |
|---|---|---|---|
| 2 412 453 | 7/1979 | France | 280/87.021 |
| 1819598 | 6/1993 | U.S.S.R. | 135/67 |
| 881450 | 11/1961 | United Kingdom | 280/87.021 |
| 2185716 | 7/1987 | United Kingdom | 135/67 |
| 2254263 | 10/1992 | United Kingdom | 135/66 |

*Primary Examiner*—Eric D. Culbreth

*Attorney, Agent, or Firm*—Richard C. Litman

[57] ABSTRACT

A cart for injured persons, designed as an alternative to crutches for individuals with an injured leg. A padded leg support surface provides a comfortable location upon which the injured leg (or cast) may be rested. The cart is propelled by the individual using the uninjured leg. The front of the cart includes two wheels mounted on forks each having a handle bar that extends upwardly. A front pad is attached to the handle bars to provide a comfortable surface for the user to lean against. Hand brakes are also included for gripping opposing sides of the front wheels to brake the cart when brake levers on the handle bars are activated. The upper ends of both handle bars also include an elastomeric hand grip. The padded leg support surface is supported by a leg support assembly that is configured to be attached to either side of the cart. This allows a user to accommodate a left or a right injured leg. The leg support assembly has three tubes that are received within either three right sleeves permanently attached to the right front fork, or three left sleeves permanently attached to the left front fork. The leg support assembly includes a swivel for pivotally mounting a rear fork and an associated rear wheel to the leg support assembly. An adjustment mechanism is provided for changing the height of the leg support surface.

17 Claims, 3 Drawing Sheets

CART FOR INJURED PERSONS

BACKGROUND OF THE INVENTION

1. Field of the Invention

The present invention is a wheeled walker for individuals having an injured leg, possibly in a cast. More specifically, the invention is a cart with two front wheels and a wheeled, leg support assembly that is attached to either side of the cart to accommodate a user's injured leg.

2. Description of the Related Art

Several types of wheeled walkers for assisting disabled individuals are known. The prior art devices, however, do not include a stable support surface that can be switched from one side of the walker the other, to provide support for either leg, as in the present invention.

U.S. Pat. No. 4,239,248, issued on Dec. 16, 1980 to Ewers shows a three wheeled collapsible walker, with a smaller rear wheel. The central seat is not designed to support an injured leg in a cast. U.S. Pat. No. 4,861,051, issued on Aug. 29, 1989 to Napper discloses a rehabilitation walker device having four small wheels. As with the Ewers' device, the central seat is not designed to support an injured leg in a cast. U.S. Pat. No. 5,167,597, issued on Dec. 1, 1992 to David, teaches a wheeled walker treatment method wherein a scooter-type walker supports the majority of an individual's weight as the walk. A leg support assembly that can be moved to either side of the walker, is not disclosed. U.S. Pat. No. 5,411,035, issued on May 2, 1995 to Stone, shows an orthopedic wheeled leg support including a handle bar and five small castor-type wheels. The support can not be repositioned from one side of the walker to the other, and is somewhat unstable in design. U.S. Pat. No. 5,427,391, issued on Jun. 27, 1995 to Cooper discloses pivoted knee skates. The skates include a leg and foot rest, a plurality of wheels and a securement mechanism for the legs and feet.

British Patent Specification No. 881,450, (Hallewell) published Nov. 1, 1961 describes a vehicle for transporting invalids. This device includes a seat for the individual, three wheels and a handle for operation control. French Patent Publication No. 2,412,453, (Reinhard), published Aug. 20, 1979 describes a scooter propelled by a rider that has a cushion on which the user sits or kneels. This scooter has a standard handlebar for operation control.

None of the above inventions and patents, taken either singularly or in combination, is seen to describe the instant invention as claimed. Thus a cart for injured persons solving the aforementioned problems is desired.

SUMMARY OF THE INVENTION

The present invention is a three wheeled cart designed as an alternative to crutches for individuals with an injured leg. A padded leg support surface provides a comfortable location upon which the injured leg (or cast) may be rested. The cart is propelled by the individual using the uninjured leg. A front right wheel is mounted on a front right fork, and a front left wheel is mounted on a front left fork. Each of the front forks has a handle bar that extends upwardly therefrom, and are connected to each other by two transverse support bars. A front pad is attached to the handle bars and one of the transverse support bars to provide a comfortable surface for the user to lean against.

Left and right hand brakes are also included. Each of the hand brakes includes an operating lever attached to the upper end of one of the handle bars. A brake cable operatively connects each operating lever to an associated brake caliper. The brake calipers grip opposing sides of the front wheels to brake the cart when the levers are activated. These types of brakes are widely used in the bicycle industry. It should be noted that the cart may be configured with only one brake on either the front left or right wheel. The upper ends of both handle bars also include an elastomeric hand grip.

The padded leg support surface is supported by a leg support assembly that is configured to be attached to either side of the cart. This allows a user to accommodate a left or a right injured leg. The leg support assembly has three tubes that are received within either three right sleeves permanently attached to the right front fork, or three left sleeves permanently attached to the left front fork. The tubes include a pair of aligned apertures, as do the three right sleeves and the three left sleeves. Once the tubes are within the desired sleeves, three pins are inserted into aligned apertures in the tubes and the sleeves.

The rear of the leg support assembly includes a vertical, rear wheel support sleeve that forms a swivel for pivotally mounting a rear fork to the leg support assembly. The rear fork has a rear wheel rotatably mounted thereon for supporting the back of the leg support assembly. The padded leg support surface includes an adjustment mechanism for changing the height of the leg support surface. Two, side by side, vertical sleeves include bottom portions perpendicularly attached to the leg support assembly. Two, side by side, leg support tubes are attached at a first end to the leg support surface and are slidably received within the vertical sleeves. In adjusting the height of the leg support surface the tubes are slid into the sleeves until the proper height is reached, and a fastener is inserted into aligned apertures in the sleeves and the tubes.

Accordingly, it is a principal object of the invention to provide a cart for a person with an injured leg, having a leg support assembly that may be attached to either side of the cart.

It is another object of the invention to provide a cart that may be disassembled for ease in transport.

It is an object of the invention to provide improved elements and arrangements thereof in a cart for persons with an injured leg for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
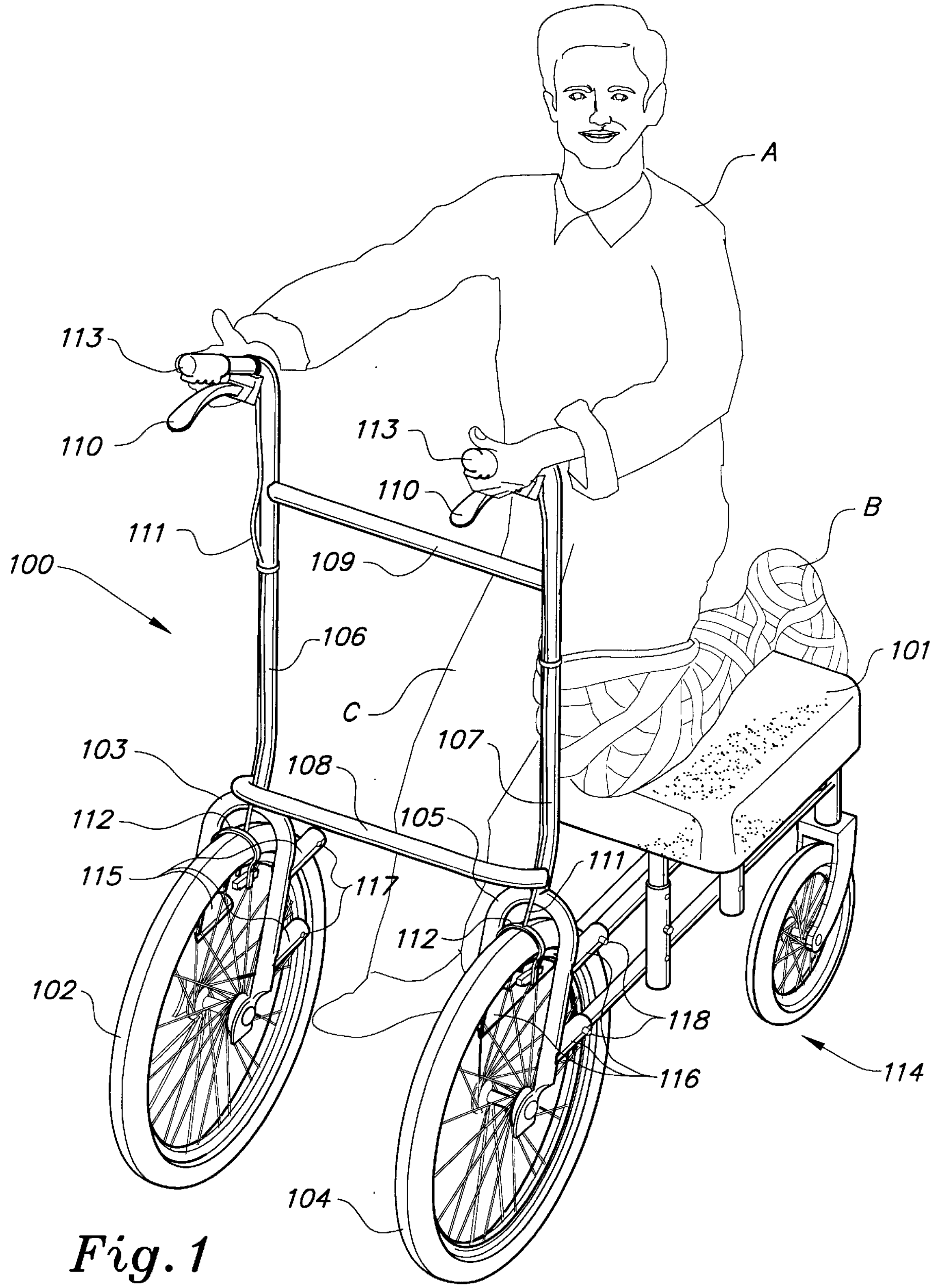
FIG. 1 is an environmental perspective view of the cart of the present invention, being used by a person with an injured leg.
Figure 2:
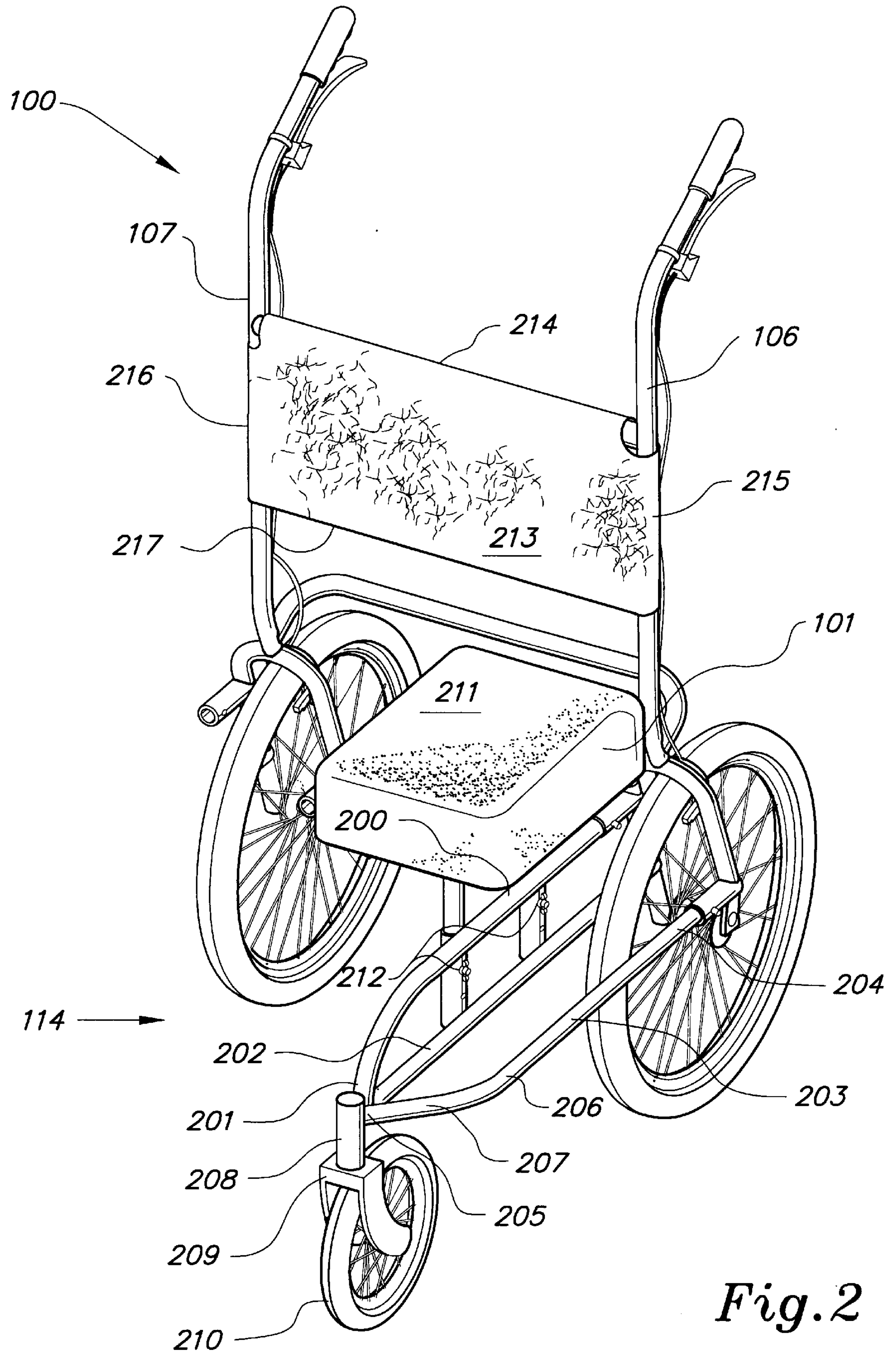
FIG. 2 is a rear perspective view of the cart of FIG. 1.
Figure 3:
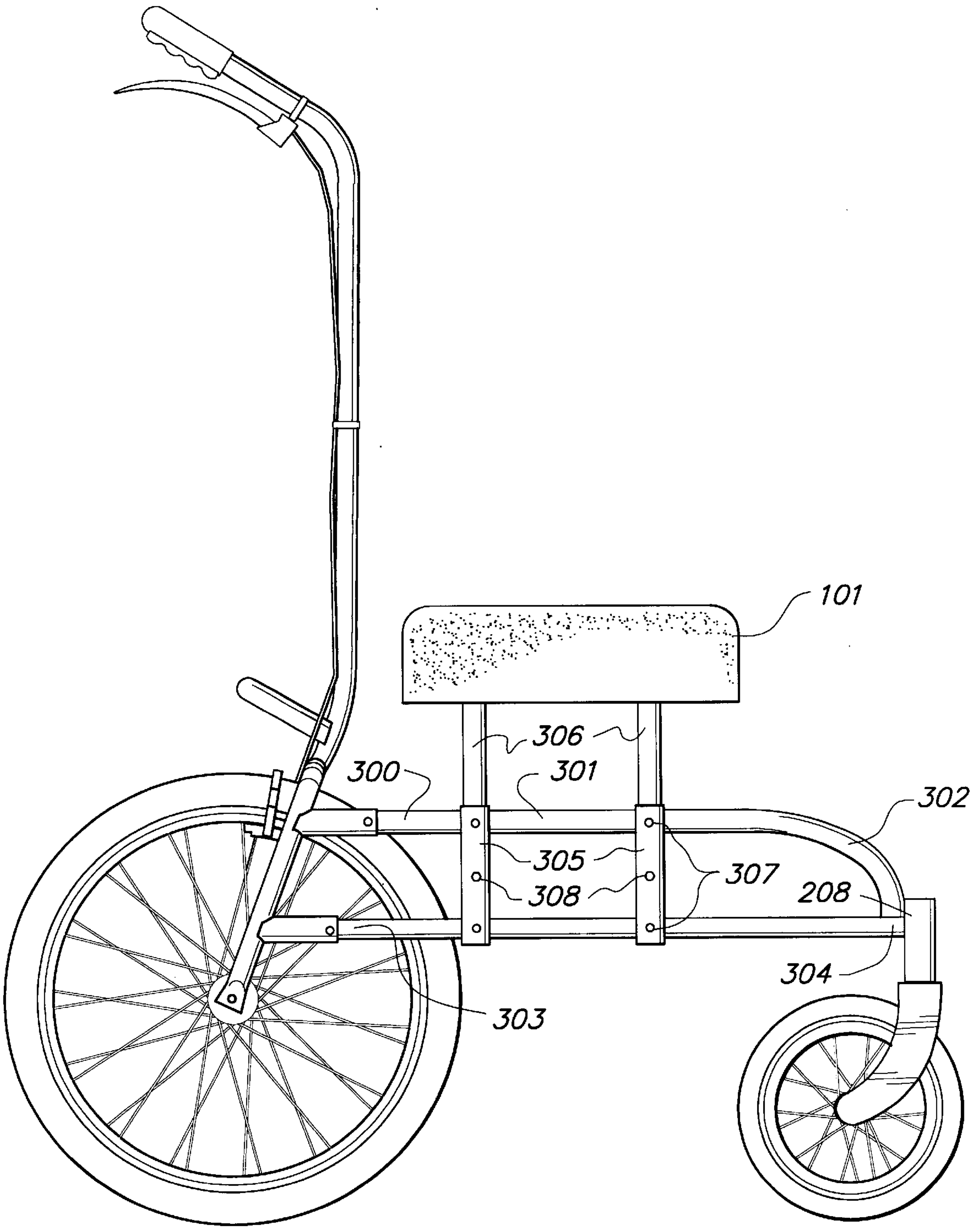
FIG. 3 is a side elevational view of the cart of FIG. 1.

The present invention is a three wheeled cart designed as a walker for individuals with a single injured leg. Details of the cart are shown in FIGS. 1–3. FIG. 1 shows a person A with their left leg in a cast B. Person A rests the cast B upon the padded leg support surface 101 of cart 100, while pushing themselves and the cart with their uninjured leg C.

The cart 100 includes a front right wheel 102 mounted on a front right fork 103, and a front left wheel 104 mounted on a front left fork 105. Each of the front forks 103 and 105 includes a handle bar (106 and 107 respectively) extending upwardly therefrom. The right 106 and left 107 handle bars are connected to each other by a first, lower, transverse support bar 108 and a second, upper, transverse support bar 109.

In order to positively brake the cart 100, a left and a right hand brake are included. Each of the hand brakes includes an operating lever 110 attached to the distal, upper end of handle bars 106 or 107. A brake cable 111 operatively connects the operating lever 110 to an associated brake caliper 112. The brake calipers 112 grip opposing sides of the front wheels to brake the cart 100 when their associated lever is activated, as is well known with these types of brakes. It should be noted that while two brakes are shown and preferred, the cart 100 may be configured with only one brake on either the front left or right wheel. To provide a secure handle, the distal ends of both handle bars include an elastomeric (preferably black rubber) hand grip 113.

The padded leg support surface 101 is supported by a leg support assembly 114 that can be attached to either side of the cart 100 to accommodate left or right injured legs. To this end, the leg support assembly 114 includes: an upper tube 200 with a first end 300, a second end 201, a substantially straight section 301, and a curved section 302; a substantially straight lower left tube 202 with a first end 303 and a second end 304; and a lower right tube 203 having a first end 204, a second end 205, a substantially straight section 206, and a curved section 207. The straight section 301 of the upper tube 200, the straight section 206 of the lower right tube 203 and the lower left tube 202 are parallel to each other. Three right sleeves 115 are permanently attached to the right front fork 103, and three left sleeves 116 are permanently attached to the left front fork 105. The first ends of the tubes 200, 202 and 203 include a pair of aligned apertures 117 therethrough, as do the three right sleeves 115 and the three left sleeves 116. To attach the leg support assembly 114 to the cart 100, the first end of tubes 200, 202 and 203 are inserted into either the right or left three sleeves (depending on the side the injured leg is on), and three pins 118 are inserted into the aligned apertures of the tubes and sleeves.

The curved section 302 of the upper tube 200 and the curved section 207 of the lower right tube 203 are configured such that the second ends of the tubes 200, 202 and 203 intersect each other. The second ends of the tubes 200, 202 and 203 are attached to each other and to a vertical, rear wheel support sleeve 208. Within sleeve 208, a vertical bar is mounted to form a swivel for pivotally mounting a rear fork 209 to the leg support assembly 114. Rear fork 209 has a rear wheel 210 rotatably mounted thereon for supporting the back of the leg support assembly 114.

The leg support surface 101 includes a padded top surface 211 for supporting the injured leg while providing a greater level of comfort. The leg support assembly 114 further includes an adjustment mechanism for changing the height the leg support surface 101 is held above the ground. Two, side by side, vertical sleeves 305 both include a bottom portion perpendicularly attached to the lower left tube 202, and a top portion perpendicularly attached to the upper tube 200. Two, side by side, leg support tubes 306 are attached at a first end to the leg support surface 101 and include a second end slidably received within the vertical sleeves 305. Each of the leg support tubes 306 include a pair of apertures, while each of the sleeves 305 has a plurality of vertically spaced pairs of apertures 307. In adjusting the height of the leg support surface 101, the tubes 306 are slid within sleeves 305 until the pair of apertures in the leg support tubes 306 align with one of the pairs of the plurality of vertically spaced pairs of apertures 307 in the sleeves 305. After the apertures are aligned, a fastener 308 is inserted into each sleeve 305 in the appropriate aperture 307. The two fasteners 308 preferably include two screws and two wing nuts 212, although other fasteners may be used. The leg support tubes 306 may each have a plurality of vertically spaced pairs of apertures.

FIG. 2 shows the front pad 213 that provides a comfortable surface for person A to lean against. The front pad 213 includes: a top edge 214 wrapped around and attached to the second, upper, transverse support bar 109; a right edge 215 wrapped around and attached to the right handle bar 106; a left edge 216 wrapped around and attached to the left handle bar 107; and a bottom edge 217 that suspends downward to a point above the first transverse support bar 108. The front pad 213 and the padded top surface 211 are preferably made of vinyl for easy cleaning. Wheels 102, 104 and 210 are preferably pneumatic, but may alternatively be made of hard rubber.

It is to be understood that the present invention is not limited to the embodiments described above, but encompasses any and all embodiments within the scope of the following claims.

I claim:

1. A cart for a person with an injured leg comprising:

a front right fork and a front left fork;

a front right wheel mounted on said front right fork, and a front left wheel mounted on said front left fork;

a right handle bar attached to and extending upward from said front right fork, and a left handle bar attached to and extending upward from said left right fork; and a leg support assembly including a rear wheel, a leg support surface, and means for removably attaching said leg support assembly to one of said front right fork or said front left fork; wherein said leg support assembly is attached to said right fork when the injured leg is a right leg; and said leg support assembly is attached to said left fork when the injured leg is a left leg.

2. The cart as defined in claim 1 wherein:

said means for removably attaching comprise at least one right sleeve permanently attached to said right front fork, and at least one left sleeve permanently attached to said left front fork;

said leg support assembly further includes at least one tube;

said leg support assembly is attached to said right fork by inserting said at least one tube into said at least one right sleeve; and said leg support assembly is attached to said left fork by inserting said at least one tube into said at least one left sleeve.

3. The cart as defined in claim 2 wherein:

said at least one right sleeve includes three right sleeves permanently attached to said right front fork, and said at least one left sleeve includes three left sleeves permanently attached to said left front fork;

said at least one tube includes three tubes;

said leg support assembly is attached to said right fork by inserting said three tubes into said three right sleeves; and said leg support assembly is attached to said left fork by inserting said three tubes into said three left sleeves.

4. The cart as defined in claim 3 wherein:

said means for removably attaching further comprises three pins;

said three right sleeves each include two aligned apertures;

said three left sleeves each include two aligned apertures;

said three tubes each include two aligned apertures;

said leg support assembly is attached to said right fork by inserting said three tubes into said three right sleeves, and inserting said three pins through said two aligned apertures in said right sleeves and said two aligned apertures in said three tubes; and said leg support assembly is attached to said left fork by inserting said three tubes into said three left sleeves, and inserting said pins through said two aligned apertures in said three left sleeves and said two aligned apertures in said three tubes.

5. The cart as defined in claim 3 wherein:

said three tubes include an upper tube, a lower left tube and a lower right tube;

said leg support assembly further comprises at least one vertical sleeve having a bottom end perpendicularly attached to said lower left tube and a top end perpendicularly attached to said upper tube, and at least one leg support tube having a first end attached to said leg support surface and a second end within said at least one vertical sleeve.

6. The cart as defined in claim 5 wherein:

said at least one vertical sleeve includes two; side by side, vertical sleeves each having a bottom end perpendicularly attached to said lower left tube and a top end perpendicularly attached to said upper tube;

said at least one leg support tube includes two, side by side, leg support tubes each having a first end attached to said leg support surface and a second end within the associated vertical sleeve.

7. The cart as defined in claim 6 wherein:

said two, side by side, vertical sleeves each have a plurality of vertically spaced pairs of apertures therethrough;

said two, side by side, leg support tubes each have a plurality of vertically spaced pairs of apertures therethrough;

said leg support assembly further includes two fasteners;

said leg support surface is adjusted by sliding said second end of said leg support tubes up or down within said vertical sleeves until a desired height of said leg support surface is achieved; and said fasteners are each inserted through one pair of said plurality of vertically spaced pairs of apertures in one of said vertical sleeves and one pair of apertures of said plurality of vertically spaced pairs of apertures in one of said leg support tubes, to thereby maintain said leg support surface at said desired height.

8. The cart as defined in claim 7 wherein:

said two fasteners include two screws and two wing nuts; and said wing nuts are threaded onto said screws after inserting the screws through the apertures in the vertical sleeves and the leg support tubes.

9. The cart as defined in claim 5 wherein:

said upper tube includes a first end, a second end, a substantially straight section, and a curved section;

said lower left tube is substantially straight and includes a first end and a second end;

said lower right tube includes a first end, a second end, a substantially straight section, and a curved section;

said straight section of said upper tube, said straight section of said lower right tube and said lower left tube are parallel to each other;

said leg support assembly further includes a vertical, rear wheel support sleeve; and said second ends of said upper tube, said lower left tube and said lower right tube are attached to each other and to said vertical, rear wheel support sleeve.

10. The cart as defined in claim 9 wherein said leg support assembly further includes:

a rear fork supporting said rear wheel; and a swivel connecting said rear fork to said rear wheel support sleeve.

11. The cart as defined in claim 2 wherein:

said means for removably attaching further comprise at least one pin;

said right sleeve includes two aligned apertures;

said left sleeve includes two aligned apertures; and said at least one tube includes two aligned apertures;

said leg support assembly is attached to said right fork by inserting said at least one tube into said at least one right sleeve, and inserting said pin through said two aligned apertures in said right sleeve and said two aligned apertures in said at least one tube; and said leg support assembly is attached to said left fork by inserting said at least one tube into said at least one left sleeve, and inserting said pin through said two aligned apertures in said left sleeve and said two aligned apertures in said at least one tube.

12. The cart as defined in claim 1, further comprising:

a first transverse support bar having a first end attached to said right handle bar proximate to said front right fork, and a second end attached to said left handle bar proximate to said front left fork;

a second transverse support bar having a first end attached to said right handle bar above said first transverse support bar, and a second end attached to said left handle bar above said first transverse support bar.

13. The cart as defined in claim 12, further comprising a front pad having a top edge, a bottom edge, a right edge and a left edge, and wherein:

said top edge is wrapped around and attached to said second transverse support bar;

said right edge is wrapped around and attached to said right handle bar;

said left edge is wrapped around and attached to said left handle bar; and said bottom edge suspends downward above said first transverse support bar.

14. The cart as defined in claim 1, further comprising:

at least one hand brake operating lever attached to a distal end of one of said handle bars;

at least one caliper brake attached to one of said front forks, said at least one caliper brake gripping opposing sides of one of said front wheels for braking said cart; and at least one brake cable operatively connected to said at least one hand brake operating lever and to said at least one caliper brake.

15. The cart as defined in claim 14, wherein:

said at least one hand brake operating lever includes two hand brake operating levers, one of said levers being attached to a distal end of said right handle bar and the other of said levers being attached to a distal end of said left handle bar;

said at least one caliper brake includes two caliper brakes, one of said caliper brakes being attached to said right front fork and the other of said caliper brakes being attached to said left front fork, said caliper brakes gripping opposing sides of said front wheels for braking said cart; and said at least one brake cable includes two brake cables, one of said brake cables being operatively connected to said one of said hand brake operating levers and to said one of said caliper brakes, and the other brake cable being operatively connected to said other of said hand brake operating levers and to said other of said caliper brakes.

16. The cart as defined in claim 1, wherein said leg support surface is provided with padding.

17. The cart as defined in claim 1, wherein said handle bars each include an elastomeric hand grip on a distal end thereof.

* * * * *